No. 717,866. PATENTED JAN. 6, 1903.
J. KELLY.
GAS BURNER.
APPLICATION FILED SEPT. 29, 1902.
NO MODEL.
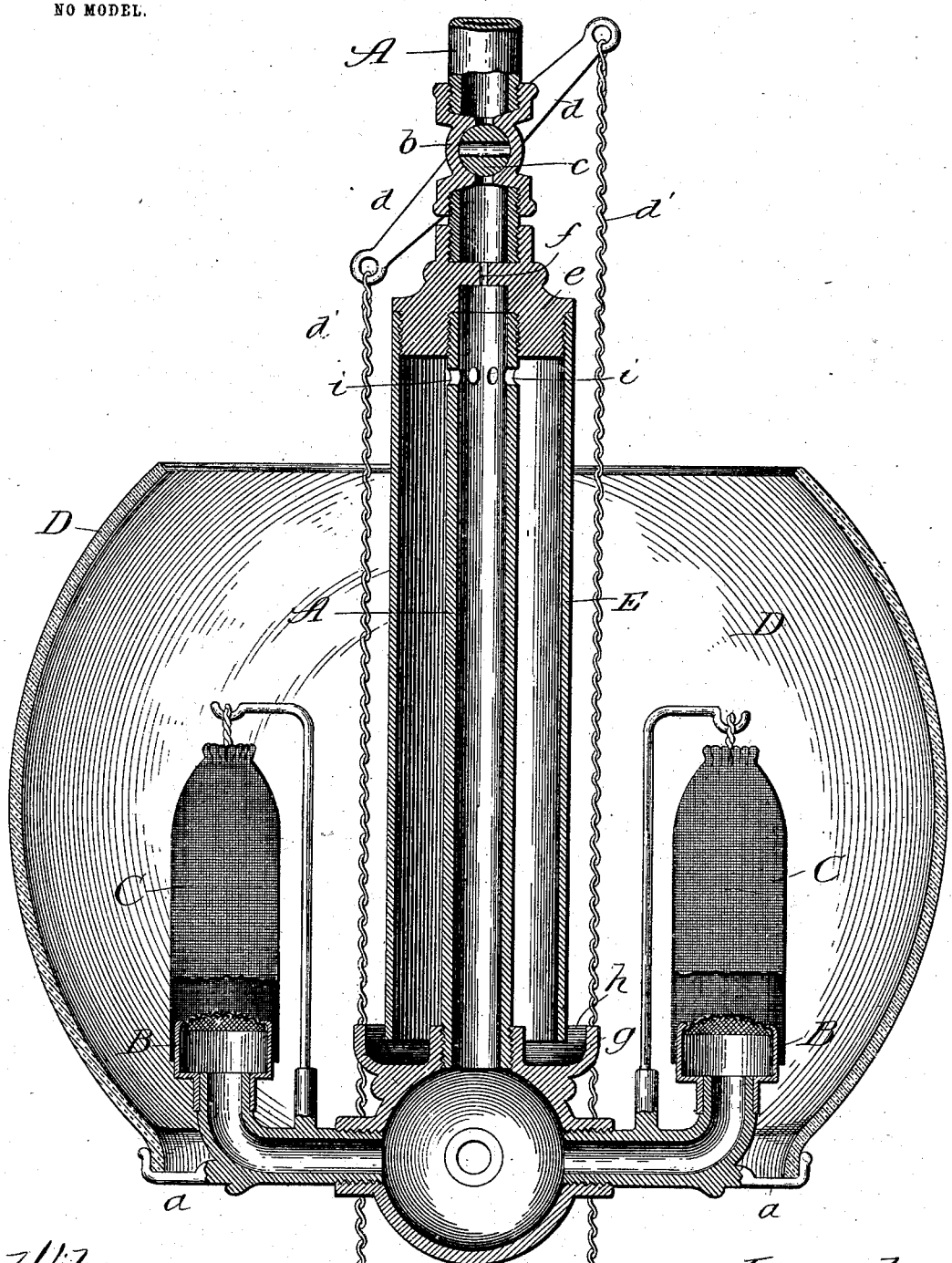
Witnesses:
Inventor:
John Kelly,

UNITED STATES PATENT OFFICE.

JOHN KELLY, OF CHICAGO, ILLINOIS.

GAS-BURNER.

SPECIFICATION forming part of Letters Patent No. 717,866, dated January 6, 1903.

Application filed September 29, 1902. Serial No. 125,203. (No model.)

*To all whom it may concern:*

Be it known that I, JOHN KELLY, a citizen of the United States, residing at Chicago, in the county of Cook and State of Illinois, have invented a new and useful Improvement in Gas-Burners, of which the following is a specification.

My invention relates to an improvement in the class of gas-burners in which a preliminary mixer for gas and air is provided in the path of the gas to the burner proper. In the use of such burners in the various forms of their construction it frequently happens that ignition accidentally takes place in the mixer, either from the heat of the flame, which then puffs out, or from careless lighting, wherein the lighted match or taper employed for ignition ignites the mixer in passing it for application to the burner proper.
The object of my invention is to prevent accidental ignition at the mixer from the first of the aforesaid causes by locating the mixer for the purpose adequately far from the flame-burner, and from the second of the aforesaid causes by shielding the mixer in a peculiar manner in addition to providing it in a remote situation relative to the burner.

The accompanying drawing shows my invention applied to a gas-fixture having a plurality of burners, each provided with a mantle for incandescent lighting, the view presented being a vertical section.

A is the gas-supply pipe, leading in a usual or any suitable manner to one or more burners B, each shown to be surmounted by a mantle C, the fixture being shown to be further provided with a sent *a* for a globe D or shade enveloping the burners. In the supply-pipe is interposed a coupling-head *b*, containing a shut-off valve *c*, provided with an operating-lever *d*, from opposite ends of which chains *d'* are shown to depend by which to operate it to turn the valve. Another coupling-head *e* is interposed in the sectional supply-pipe A and contains the pressure-reducing opening *f*, of a diameter according to requirement.

E is a tubular shield depending from the head *e*, about which it is shown fastened by screwing it in place, to close it at its upper end and permit it to be longitudinally adjusted to increase or decrease the width of air-inlet space *h* between its lower end and a cup *g* there shown to surround and overlap it, with the primary purpose of covering to hide from view the free end of the shield-tube, and thus lend a finished appearance to the part. Near the inner end of the shield the supply-pipe A is perforated, a circumferential series of perforations *i* being shown to admit air from the chamber afforded by the tubular shield into the supply-pipe by suction of the gas flowing through the pipe to mix with the gas for promoting its combustibility. The mixer is thus provided in the supply-pipe itself and is shielded by the tube E to control the supply of air and with the effect of rendering the mixer practically inaccessible for lighting in its position, which, moreover, is such as to bear no relation to the relative height of the burners from the floor or other base, while on the more commonly used form of gas-light burner equipped with a mixer the latter is below it, and if removed from it adequately far to prevent ignition of the mixer from the flame tends to raise the burner to an unduly-elevated position.

An incidental advantage is due to the construction adapting the shield E to be surrounded by a globe D, since the air-supply must pass to the mixer through the heat generated in the globe from the burners, and it therefore becomes more or less heated in its course and the better, therefore, promotes combustion of the gas.

What I claim as new, and desire to secure by Letters Patent, is—

1. In combination with a gas-burner and the gas-supply pipe leading thereto, a mixer comprising a perforated section of said pipe, above the plane of the burner, for the admission of air into the pipe for mixture with the gas passing through it, and a shield covering said perforated pipe-section and forming about it an air-chamber open to the atmosphere and to said perforated section.

2. In combination with a gas-burner and the gas-supply pipe leading thereto, a mixer comprising a perforated section of said pipe, above the plane of the burner, for the admission of air into the pipe for mixture with the gas passing through it, and a tubular shield adjustably supported to depend about and cover said perforated section and form about said pipe an air-chamber open at its lower end to the atmosphere.

3. In combination with a gas-burner and the gas-supply pipe leading thereto, a mixer comprising a perforated section of said pipe, above the plane of the burner, for the admission of air into the pipe for mixture with the gas passing through it, a tubular shield supported to depend about and cover said perforated section and form about said pipe an air-chamber, open at its lower end to the atmosphere, and a cup overlapping the lower end of said shield and forming therewith the air-inlet space.

4. In combination with one or more gas-burners and a gas-supply pipe leading thereto, a mixer comprising a perforated section of said pipe above the plane of the burner for the admission of air into the pipe for mixture with the gas passing through it, a coupling-head interposed in said pipe adjacent to the perforations therein, and a tubular shield screwed upon said head to suspend it about the pipe to cover said perforations and form about the same an air-chamber closed at its upper end and open at its lower end to the atmosphere, and a seat for a globe to surround said burners and shield.

JOHN KELLY.

In presence of—
L. HEISLAR,
ALBERT D. BACCI.